(12) United States Patent
Gilmour

(10) Patent No.: US 6,801,476 B2
(45) Date of Patent: Oct. 5, 2004

(54) WRIST-WORN PHONE AND BODY-WORN DATA STORAGE DEVICE

(76) Inventor: Daniel A. Gilmour, 87 Westmont St., West Hartford, CT (US) 06117

(*) Notice: Subject to any disclaimer, the term of this patent is extended or adjusted under 35 U.S.C. 154(b) by 0 days.

(21) Appl. No.: 10/410,325

(22) Filed: Apr. 9, 2003

(65) Prior Publication Data

US 2003/0194084 A1 Oct. 16, 2003

Related U.S. Application Data

(60) Provisional application No. 60/430,852, filed on Dec. 4, 2002, and provisional application No. 60/372,477, filed on Apr. 15, 2002.

(51) Int. Cl.[7] .......................... G04B 47/00; G04B 47/02
(52) U.S. Cl. ............................................ 368/13; 368/10
(58) Field of Search ...................................... 368/10, 13

(56) References Cited

U.S. PATENT DOCUMENTS

| | | | |
|---|---|---|---|
| 3,998,045 A | * 12/1976 | Lester ........................... | 368/63 |
| 4,334,315 A | * 6/1982 | Ono et al. .................. | 455/11.1 |
| 4,847,818 A | 7/1989 | Olsen ........................... | 368/10 |
| 5,008,864 A | * 4/1991 | Yoshitake .................... | 368/10 |
| 5,228,012 A | * 7/1993 | Seager ......................... | 368/10 |
| 5,235,560 A | 8/1993 | Seager ......................... | 368/10 |
| 5,260,915 A | * 11/1993 | Houlihan ..................... | 368/10 |
| 5,418,760 A | 5/1995 | Kawashima et al. .......... | 368/69 |
| 5,812,498 A | 9/1998 | Teres ........................... | 368/10 |
| 6,046,732 A | 4/2000 | Nishimoto ................... | 345/168 |
| 6,192,253 B1 | 2/2001 | Charlier et al. ............. | 455/550 |
| 6,212,414 B1 | 4/2001 | Alameh et al. .............. | 455/575 |
| 6,272,359 B1 | 8/2001 | Kivela et al. ................ | 455/567 |
| 6,394,813 B1 | 5/2002 | Stout et al. ................... | 439/11 |
| 6,462,953 B2 | 10/2002 | Tong et al. ................... | 361/732 |
| 6,466,434 B1 | 10/2002 | Tsai ............................ | 361/685 |
| 6,477,117 B1 | 11/2002 | Narayanaswami et al. .. | 368/251 |
| 6,535,461 B1 | * 3/2003 | Karhu .......................... | 368/10 |

OTHER PUBLICATIONS

US Pub. No.: US 2001/0003205 A1, Jun. 7, 2001, Gilbert, 713/320, Jul. 15, 1998.
US Pub. No.: US 2002/0005707 A1, Jan. 17, 2002, Kerai et al., 320/106, May 25, 2001.
US Pub. No.: US 2002/0076962 A1, Jun. 20, 2002, Williams, 439/188, Dec. 18, 2000.

* cited by examiner

*Primary Examiner*—Randy W. Gibson
*Assistant Examiner*—Michael L. Lindinger
(74) *Attorney, Agent, or Firm*—Cantor Colburn LLP (57) ABSTRACT

A wrist-worn phone is disclosed which includes a main housing with a front surface and a rear surface, the rear surface including speaker holes, the front surface having a display. The wrist-worn phone further includes a first strap attached to a first end of the main housing, the first strap having an outer end. A second strap may be attached to the second end of the main housing, the second strap having an outer end, the outer end of the first strap for connecting with the outer end of the second strap. The second strap may be made from a shape retaining material for forming a generally elongated C shape such that the rear surface of the main housing is on an interior of the C shape. The wrist-worn phone may include an ear latch for hanging the main housing upon a human ear. A body-worn data storage device may include a plug mounted onto a strap of the device for insertion into a port of a computing device.

10 Claims, 7 Drawing Sheets

WRIST-WORN PHONE AND BODY-WORN DATA STORAGE DEVICE

CROSS-REFERENCE TO RELATED APPLICATIONS

This application claims the benefit of U.S. Provisional Patent Application No. 60/430,852, filed on Dec. 4, 2002, herein wholly incorporated by reference in its entirety. This application also claims the benefit of U.S. Provisional Application No. 60/372,477, filed on Apr. 15, 2002, herein wholly incorporated by reference in its entirety.

BACKGROUND OF THE INVENTION

This invention relates to a phone and an electronic data storage device which can be worn on the body, and more particularly relates to a phone that can be used as comfortably as a handheld phone and to an electronic data storage device with simplified connection to a USB port of a computer.

Mobile telephones also commonly referred to as cell phones are becoming smaller and smaller all the time. The miniaturization of circuits is now allowing engineers the ability to package mobile phones in ever more compact sizes. Mobile telephones in the size and shape of a wristwatch are now possible.

Most small mobile phones on the market today allow the usage of a hands-free headset that plugs into a jack in the phone and then attaches around or into the ear. Typically along the cord or on an extension boom projecting downward from the earpiece is a microphone. This is necessary to improve the sound pickup from the mouth of the user.

Most phones also permit usage by holding the phone up to the side of the head directly to locate a speaker within the phone near to the ear and a microphone in the phone near to the mouth as people have become accustomed to with home based corded phones. This is important since it allows usage of the phone without the headset. These headsets typically have a wire that is three to five feet long. This allows the user to talk while the phone is located on a belt-clip or in a pocket. This wire, however, can easily tangle and is difficult to retrieve, unwind, plug into the phone and mount on the ear to answer an incoming call before the caller hangs up or the voice messaging system takes the call.

A phone in the form or a wristwatch has the problem of being very awkward for the user to hold to near their ear for more than a short period of time. The basic watch shape does not locate a microphone close to one's mouth. An extension boom with a microphone could be added but it would create an undesirable appendage and it would not resolve the awkwardness of holding to the ear.

Some attempts have been made at solving this problem. U.S. Pat. No. 4,847,818 to Olsen discloses a wristwatch which can be removed from the wearer's wrist and placed adjacent the head of the user for use as a radiotelephone. One problem with this watch is the flexibility of the band which makes it awkward to use and hold in a constant and comfortable position using only one hand. The speaker is located on an exterior portion of the watch so that the exterior of the watch must be held to the user's head thus requiring that the watch be bent in an opposite manner than when it is worn on the wrist.

U.S. Pat. No. 5,235,560 to Seager solves the flexible wristband problem by employing a rigid wristband. However, this does not allow adjustment to different user wrist sizes and requires complicated manual maneuvering of the wristband before the radiotelephone can be used.

U.S. Pat. No. 6,192,253 to Charlier et al incorporates an inwardly facing speaker on a flexible wristband, however Charlier et al requires an additional bulky housing at the inner wrist portion when worn by the user which can interfere with normal daily operations.

While these patents have attempted to solve the problems associated with wristwatch phones that must be spoken into and listen to from one location, and have eliminated the need for long and troublesome headsets, they have neglected the "hands free" aspect of phones which has become very desirable when driving or when phone conversations become lengthy and tiresome on the arms.

The miniaturization of electronic circuits now allows, engineers to package sophisticated devices into very compact spaces, such as cellular phones, personal digital assistant ("PDA"), MP3 (MPEG (Moving Picture Experts Group) audio Layer-3) music player, voice recorder, infrared remote controller, Global Positioning System ("GPS") sensor, and solid-state data storage devices. Data can be downloaded into or synchronized with a computer via a hard-wired connection or an infrared wireless connection. The versions that are hard-wired commonly have a cradle that the device connects to which has a wire that connects to the computer's serial or Universal Serial Bus ("USB") port.

USB provides an easy and fast connection of a vast majority of peripheral devices to a computer. Laptop computers, desktop computers, wearable computers, and PDA's are commonly manufactured with USB ports in order to take advantage of the variety of peripheral devices which are built around that architecture. Many USB peripheral devices, such as printers, scanners, mice, joysticks, digital cameras, web cams, modems, speakers, phones, etc., come with their own built in cable, and the cable has an "A" connection on it. The "A" connector is a connector which heads upstream towards the computer. A USB port on a computer is designed to accept an "A" connector. If the USB peripheral device does not have a built in cable with the "A" connector, then the device has a socket on it that accepts a USB "B" connector. The "B" connector is a connector which heads downstream and connects to an individual device. Since the USB port on the computer only accepts the "A" connector and not the "B" connector, plugging the cable into either or both the computer and the peripheral device is nearly error-proof.

The USB standard provides that in addition to carrying data bi-directionally, A USB cable must also supply electrical power unidirectionally. The power and data passes through pre-defined terminals or pin-outs provided on standardized plugs on each free end of the USB cable. The plugs are defined in the standard as having different forms at upstream and downstream ends. Each plug can mate only with a complementary shaped receptacle or port provided in the USB device to be connected. Thus, the standard ensures that a cable can only be connected to provide power from an upstream port to a downstream port.

BRIEF SUMMARY OF THE INVENTION

The above discussed and other drawbacks and deficiencies are overcome or alleviated by a wrist-worn phone including a main housing having a front surface and a rear surface, the rear surface including speaker holes, the front surface having a display, a first strap attached to a first end of the main housing, the first strap having an outer end area, a second strap attached to the second end of the main housing, the second strap having an outer end area, the outer end area of the first strap for connecting with the outer end area of the second strap, wherein the second strap is made from a shape retaining material for forming a generally elongated C shape, and wherein the rear surface of the main housing is on an interior of the C shape.

In an alternate embodiment, a wrist-worn phone includes a speaker housing, a pair of straps for connecting the speaker housing to a wrist, and an ear hanger connected to the speaker housing for hanging the speaker housing on a human ear.

In an alternate embodiment, a body-worn device includes an electronic data storage unit, a first strap having a first end and a second end, the first end connected to a first side of the unit, a USB plug connected to the second end of the first strap, a cable within the strap connecting the USB plug to the unit for providing electronic communication between the USB plug and the unit, a second strap having a first end and a second end, the first end of the second strap connected to a second side of the unit, wherein the first and second straps are connectable to each other, and wherein an overall length of the first and second straps is sized for encircling a body part.

The above discussed and other features and advantages of the present invention will be appreciated and understood by those skilled in the art from the following description and drawings.

BRIEF DESCRIPTION OF THE DRAWINGS

Referring to the exemplary drawings wherein like elements are numbered alike in the several FIGS..

DETAILED DESCRIPTION OF THE PREFERRED EMBODIMENTS

Figure 1:
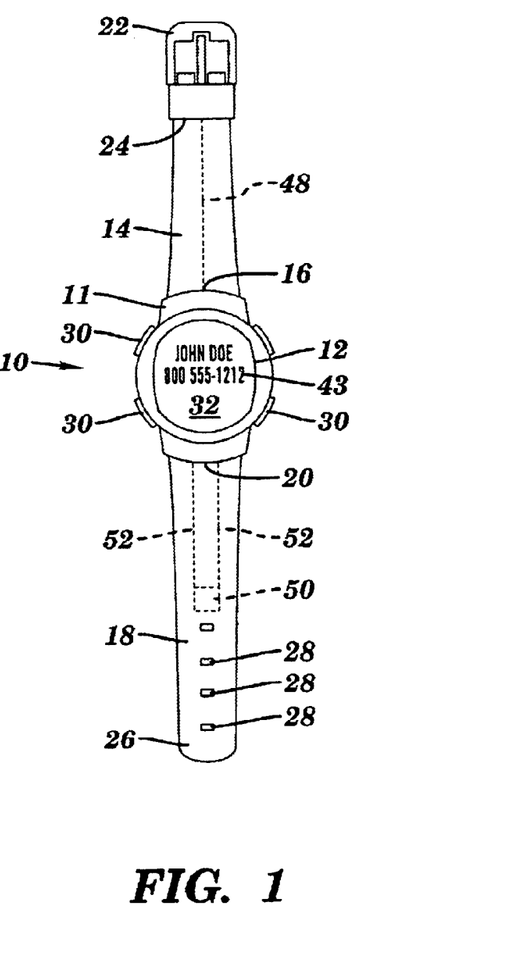
FIG. 1 is a front plan view of a wristwatch phone.

Referring to FIG. 1, a wristwatch phone 10 is shown having a body 11, a main housing 12, a first strap 14 attached to a first end 16 of the main housing 12, and a second strap 18 attached to a second end 20 of the main housing 12. The first strap 14 and the second strap 18 could be two separate straps, or alternatively the first strap 14 and the second strap 18 could be a single contiguous strap with the main housing 12 positioned thereon. The first strap 14 may include a buckling device 22 positioned on an outer end 24 of the first strap 14. The buckling device 22 may cooperate with openings 28 positioned adjacent an outer end 26 of second strap 18. It is also within the scope of this invention to utilize alternative devices for securing the outer ends 24 and 26 together to form a loop suitable for surrounding a user's wrist. Although the term "wristwatch phone" is used, it should be understood that the phone 10 may or may not have time keeping capabilities, and therefore may be more broadly described as a "wrist-worn" phone 10.

The main housing 12 of the wristwatch phone 10 preferably includes a display 43 on a front surface 32 of the housing 12 and a series of actuating push buttons such as buttons 30 to activate and deactivate the phone as well as to perform timekeeping functions such as setting time of day. The main housing 12 may further preferably incorporates a time keeping circuit for performing conventional watch functions, a radio transceiver designed to provide two-way mobile telephone communication, and a power supply, as will be further described below. Alternatively, the phone 10 may be designed such that it does not include time keeping capabilities.

The strap 18 further preferably includes a microphone 50, shown in phantom, which may be placed adjacent the outer end 26. Although the openings 28 are shown as positioned between the microphone 50 and the outer end 26, the microphone 50 could be placed anywhere along the length of the strap 18 as is deemed appropriate for use, such as two to four inches away from the housing 12. Embedded within the strap 18 may be one or two conductors 52 which serve as audio leads to connect the microphone 50 to the transceiver in the housing 12. Alternatively, the microphone 50 could be wireless.

The strap 14 further preferably includes at least one antenna 48. The conductors 52, if used, may further serve as dipole antennae. The antenna 48 and conductors 52 may be embedded in the straps 14, 18 by injection molding the strap material around the conductors 52 and antenna 48, or by laminating the conductors 52 and antenna 48 between two pre-molded strap layers which are adhered together by adhesive, stitching, etc.

Figure 2:
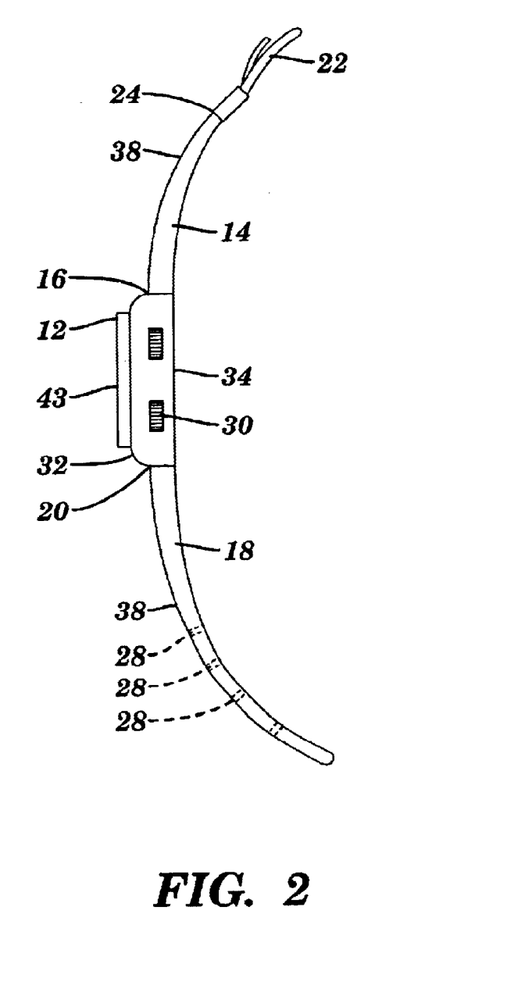
FIG. 2 is a side view of the wristwatch phone of FIG. 1.

Referring to FIG. 2, it can be seen that the straps 14 and 18 are curved to generally form an elongated "C" shape with the rear surface 34 of the housing 12 being on the interior of the "C" shape and the front surface 32 of the housing 12 being on the exterior of the "C" shape. The straps 14 and 18 are preferably made of a shape retaining material 38 with enough flexibility and deformability to be attached around a wrist. When the outer ends 24, 26 are released from each other and the phone 10 is removed from a wearer's wrist, the straps 14 and 18 preferably retain some of the curvature necessary for securing the phone 10 to a wrist such that the resultant "C" shape shown in FIG. 2 is maintained. Exemplary shape retaining materials include leather, flexible plastic, and bendable metal. Alternatively, other more limp leather, plastics, or cloth which are embedded with strips of shape retaining leather, flexible plastic, or bendable metal could also be used. It is also within the scope of this invention to utilize any available material which is capable of retaining the shape shown in FIG. 2 after the outer ends 24, 26 of the straps 14, 18 are released from each other.

Figure 3:
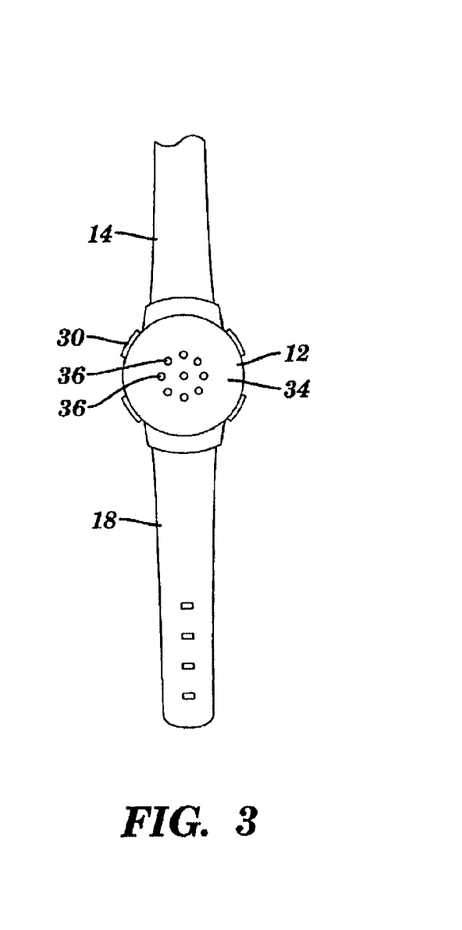
FIG. 3 is a partial rear plan view of the wristwatch phone of FIG. 1.
Figure 6:
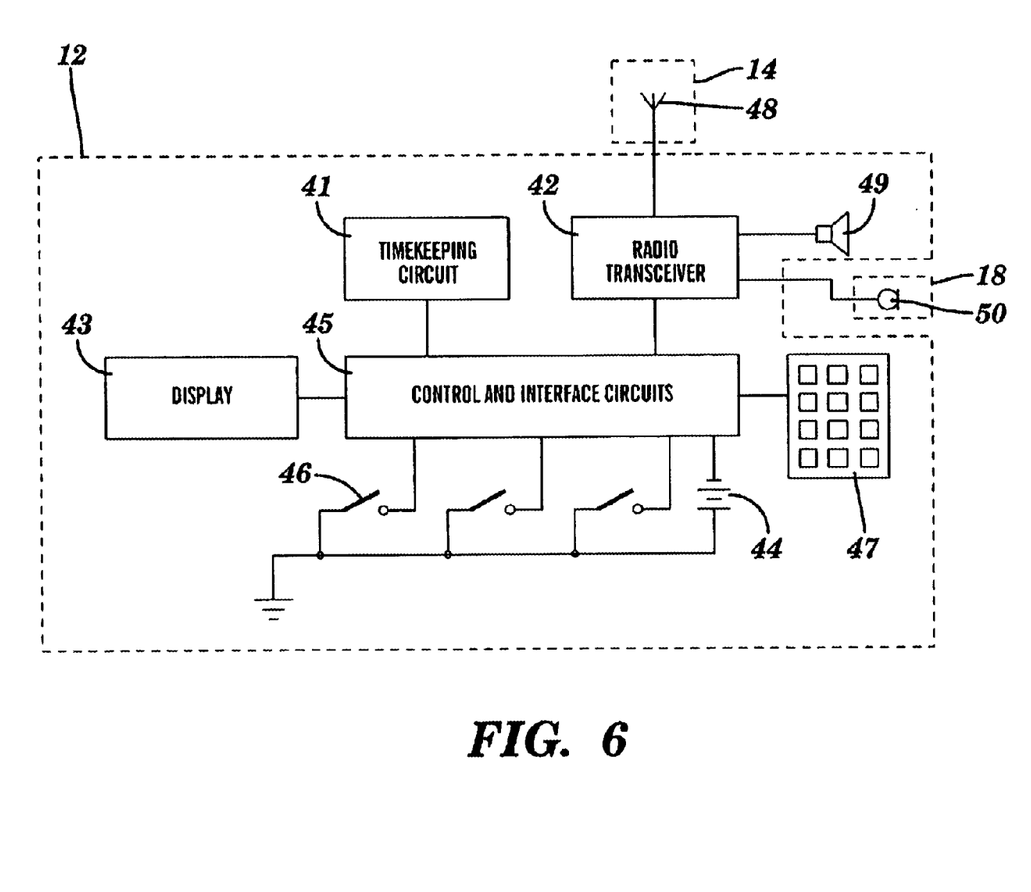
FIG. 6 is a simplified schematic drawing of components within the wristwatch phone of FIG. 1.

In addition to the elements described above, the main housing 12 further incorporates a speaker 49 (FIG. 6). Visible from the rear surface 34 of the main housing 12, as shown in FIG. 3, are holes 36, which may be provided in alternate shapes and arrangements, to allow sound to emanate from the speaker 49.

Figure 4:
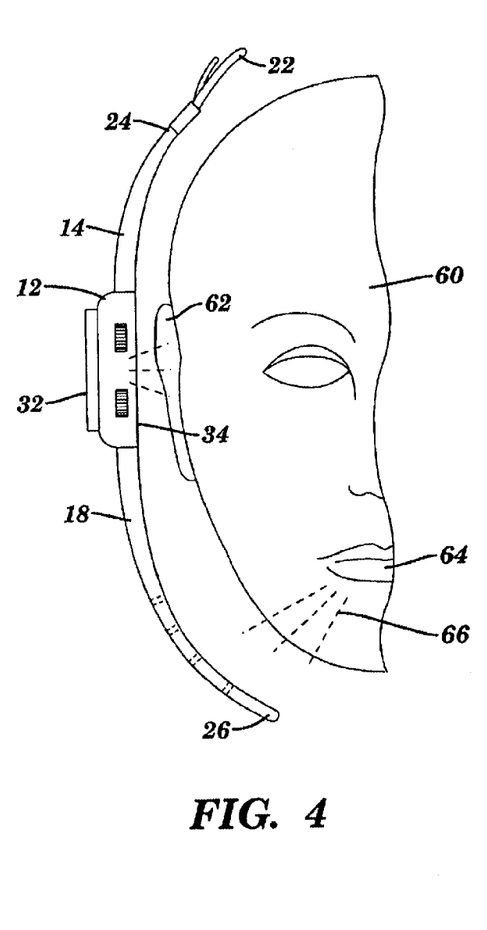
FIG. 4 is a side view of the wristwatch phone of FIG. 1 located next to a user's face in the orientation in which it would be used while talking.

Turning now to FIG. 4, it can be seen how the curvature of the straps 14 and 18 and the placement of the speaker holes 36 on the rear surface 34 of the housing 12 are advantageously utilized. When a user 60 desires to utilize the phone watch 10 in phone mode, the watch 10 is removed from the user's wrist by releasing outer end 24 of strap 14 from outer end 26 of strap 18. The watch 10 will open naturally to the elongated "C" shape shown in FIG. 2. The user 60 may then place the rear surface 34 of the housing 12, which contain the speaker holes 36 shown in FIG. 3, adjacent his/her ear 62. The shape retaining material 38 of the straps 14, 18 will naturally direct the microphone 50 embedded in strap 18 towards the user's mouth 64 and the direction of the user's speech 66. The antenna 48 embedded in the strap 14 advantageously extends above the user's ear 62 for reception comparable to a regular cordless or cell phone.

Figure 5:
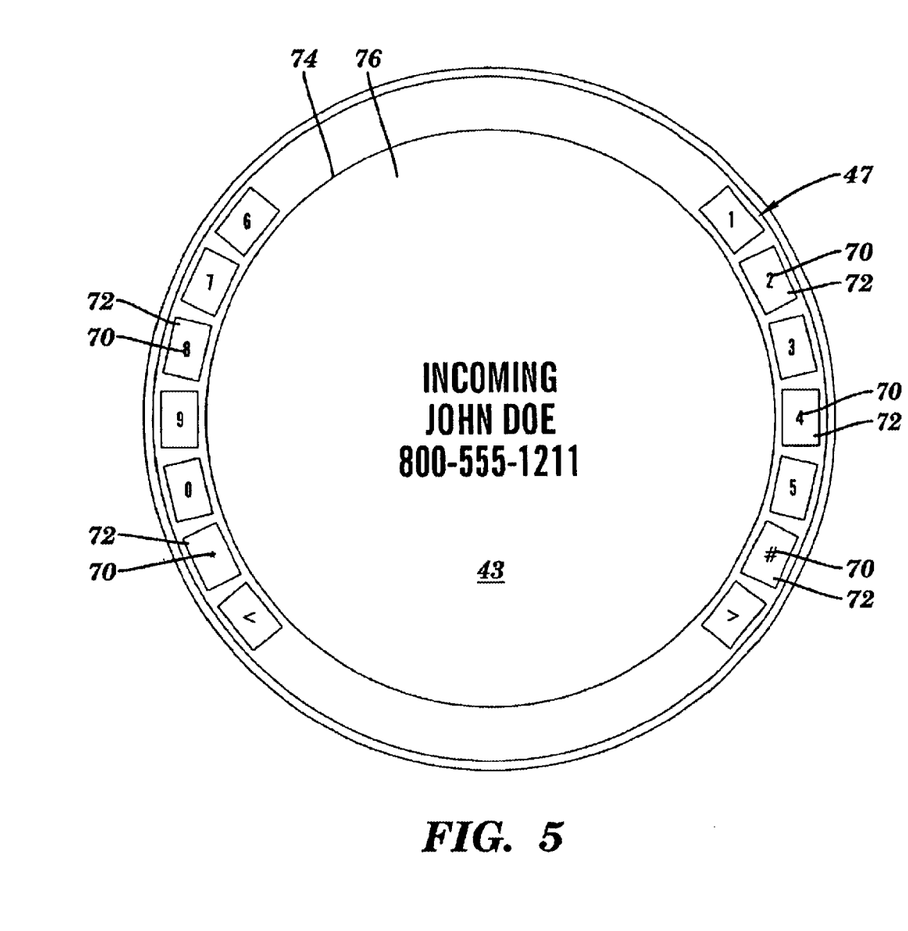
FIG. 5 is a front plan view of an exemplary keypad for use in the wristwatch phone of FIG. 1.

While any dialing or data entry devices are within the scope of this invention, FIG. 5 shows an exemplary telephone dialing keypad 47, as further described in U.S. patent application Ser. No. 09/684,237 to Gilmour, filed on Oct. 6, 2000, herein incorporated by reference in its entirety. The keypad 47 includes a group of alphanumeric data characters 70 located on buttons 72 spaced from one another substantially about the periphery 74 of the face 76, or display 43, for data selection. Alternate dialing or data entry devices such as grid-like keypads, voice recognition systems, touch screen entry systems, separable keypads, etc. are within the scope of this invention and may be incorporated at any location along the body 11 of the phone watch 10.

FIG. 6 is a simplified schematic view of the major components contained within the watch 10. The components contained in the housing 12 are a timekeeping circuit 41, a radio transceiver 42, a display 43, power supply 44, and control and interface circuits indicated at 45. In actual practice timekeeping circuit 41 and control and interface circuit 45 may be part of a single integrated circuit or microcomputer. Manually actuated switches such as 46 may be disposed on the housing 12 to control the operation of the wristwatch timekeeping circuit, as well as to activate and select operational modes of the radio transceiver 42. The switches 46 are associated with the tangible buttons 30 shown in FIGS. 1 and 2. A telephone dialing keypad 47 may either be arranged on the housing as shown in FIG. 5 or in some cases may be separated therefrom and carried on the strap as a separate component, or may be replaced by a voice recognition system or touch screen entry system as previously described. Connected to the radio transceiver 42 are a dipole antenna 48 which is arranged in the strap 14 as previously described, a speaker 49 which is disposed in the main housing 12 behind speakers holes 36 as previously described, and a microphone 50 which is disposed in the strap 18 as previously described. While the power source 44 and keypad 47 are shown as contained within the main housing 12, these elements may be separated from the main housing 12. The power source 44 could be recharged at night in a conventional battery-recharging cradle.

Figure 7:
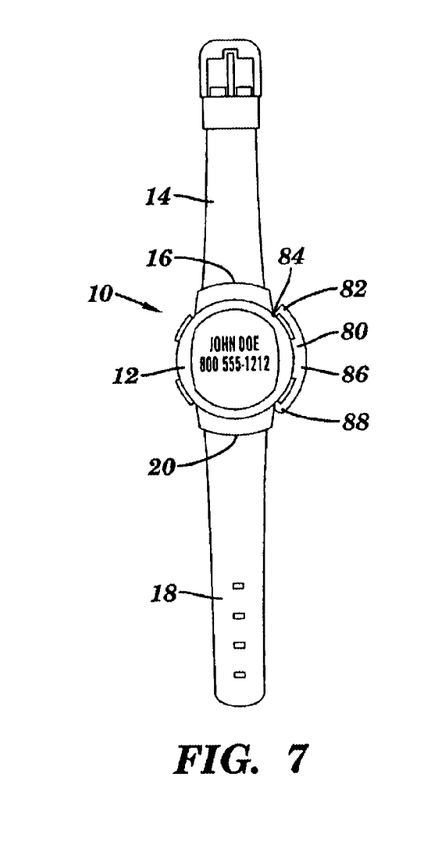
FIG. 7 is a front plan view of a wristwatch phone having an ear latch in the closed position.
Figure 8:
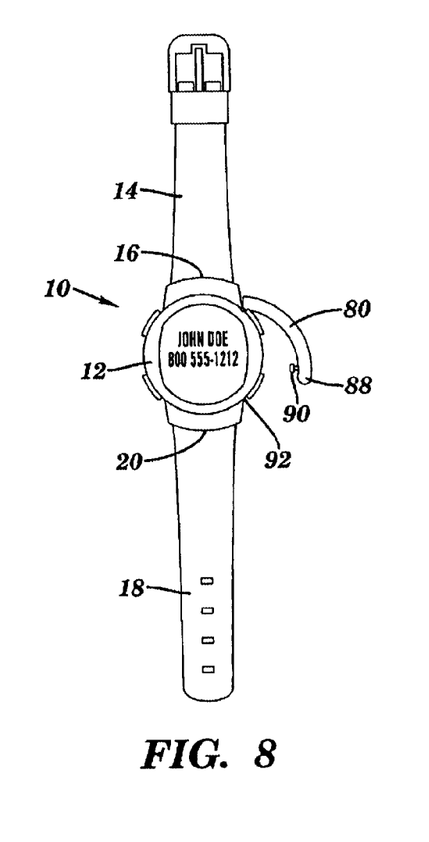
FIG. 8 is a front plan view of a wristwatch phone having an ear latch in the open position.
Figure 9:
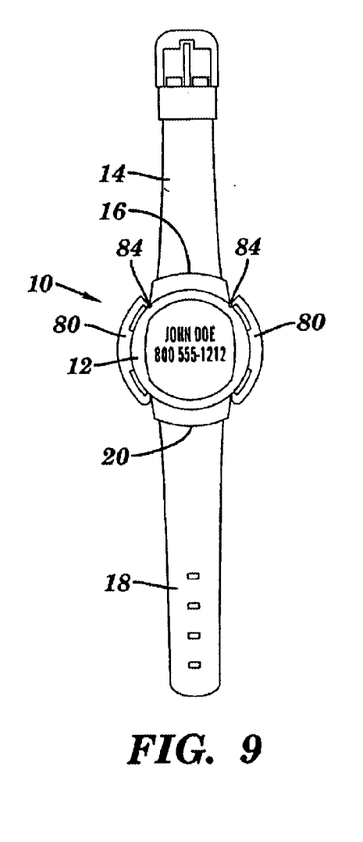
FIG. 9 is a front plan view of a wristwatch phone having a pair of ear latches.

While employing the speaker 49 within the housing 12 has the advantage of eliminating the unwieldy headsets and cords of the prior art, it also presents the user 60 with the necessity to hold the watch 10 adjacent the ear 62 during all telephone conversations. Turning now to FIGS. 7–9, an additional feature which may be incorporated into the phone watch 10 is shown. Ear latch 80 may be attached onto the housing 12 for hanging the phone watch 10 on the user's ear 62 during use as a phone, thus freeing the user's hands during telephone conversations, and advantageously eliminating the need for headsets and cords. The ear latch 80, as shown in FIG. 7, may include an ergonomically shaped body 86 having an attached end 82 and a free end 88. The attached end 82 is preferably pivotally attached to the housing 12 via pivot 84 which is placed adjacent the first end 16 of the housing 12. In a closed position of the ear latch 80, as shown in FIG. 7, the free end 88 is adjacent the housing 12 such that the entire body 86 of the ear latch 80 conforms to the housing 12. When the phone watch 10 is to be used as a phone, the ear latch 80 may be moved to an open position as shown in FIG. 8 such that the free end 88 is separated from the main housing 12. Then, the ear latch 80 may be hung on the user's ear 62 such that the rear surface 34 of the housing 12 containing the speaker holes 36 is held closely adjacent the ear 62. The pivot 84 may include position memory such that the ear latch 80 may be opened and set at a desired position. Alternatively, the attached end 82 may include a stop such that the free end 88 can only be separated from the main housing 12 by a preset amount.

For retaining the ear latch 80, when not in use, within the confines of the main housing 12, the position memory of the pivot 84 may be sufficient. Alternatively, a connector 90 may be placed upon the free end 88 or at the connecting location 92 where the free end 88 abuts in the closed position. The connector 90 may be the press fit connection shown, or may include any other mechanical connector devices for releasably securing the free end 88 to the connecting location 92 when the ear latch 80 is not in use. Alternatively, cooperating magnets could be placed within free end 88 and connecting locating 92. It is within the scope of this invention to utilize any suitable connecting means desired within the ear latch 80, as well as to eliminate the need for such connecting means by providing a sufficiently stiff pivot 84 which may retain the ear latch 80 in the position shown in FIG. 1 without the need for connecting devices in the free end 88 or connecting location 92. If a connecting device is used, it is preferred that the device does not interfere with the use of the ear latch 80 or make wearing the ear latch 80 uncomfortable for the user 60.

With the speaker holes 36 located on the rear surface 34 of the phone watch 10, an ear latch 80 placed on the right hand side of the front surface 32 of the main housing 12 as shown in FIGS. 7 and 8 is most effectively hung on a left ear of a user 60. Alternatively, an ear latch 80 could be placed on the left hand side of the front surface 32 of the housing 12 such that the phone watch 10 could be effectively hung on a right ear of the user 60. Alternatively, as shown in FIG. 9, a pair of ear latches 80 could be employed on both sides of the housing 12 such that the phone watch 10 could be effectively hung on either ear of the user 60.

While the ear latches 80 have been disclosed as pivotally attached to the main housing 12, an ear latch could also be provided which is permanently retained in an ear-hanging configuration as shown in FIG. 8, thus eliminating the need for a pivotal connection and a connector, although such an ear latch would extend beyond the confines of the main housing. Alternatively, an ear latch in an ear-hanging configuration could be a separate element which is secured to the phone watch 10 when desired. In any of the above-described embodiments, the ear latch may be ergonomically conformed to the rear of a human ear for maximum comfort. Also, the ear latch 80 may be made of a shape retaining material such that it may be custom fit to the user's ear. In yet another embodiment, an elastic strap may be connected adjacent first end 16 and second end 20 of the main housing 12 for simply strapping the main housing against the user's ear 62.

Thus, the watch phone 10 incorporates a mobile phone in the form of a wristwatch. The phone's speaker holes 36 are located on the rear surface 34 of the main housing 12 of the phone 10. The rear surface 34 is in contact with the wrist when the watch 10 is worn. A microphone 50 is incorporated into the strap 18 of the watch 10 approximately two to four inches away from the speaker holes 36. The user 60 may remove the watch 10 from his or her wrist to use it as a phone. Once removed the rear surface 34 of the phone 10 is held up to the ear 62 with the strap 18 containing the microphone 50 pointed downward towards the users mouth 64. The natural curvature of the shape retaining material 38 used in the straps 14, 18 maintains the microphone 50 in an appropriate speaking position without the need for holding the microphone 50 adjacent the mouth 64. Additionally, the phone 10 may include an ear latch for hanging the main housing upon the ear 62 of the user 60, thus providing hands-free telephone conversations.

Figure 10:
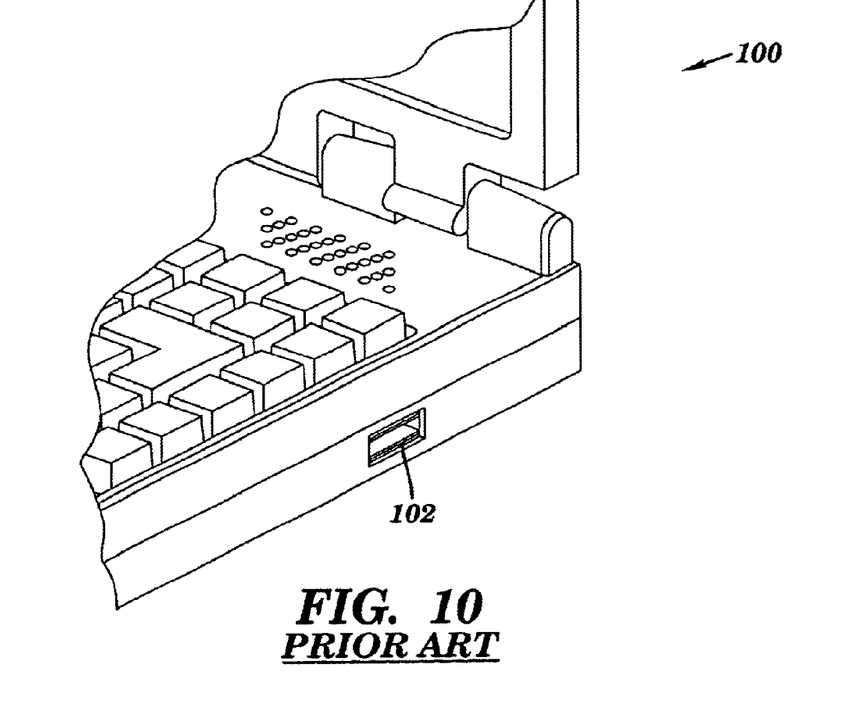
FIG. 10 is a perspective view of a prior art computing device.
Figure 11:
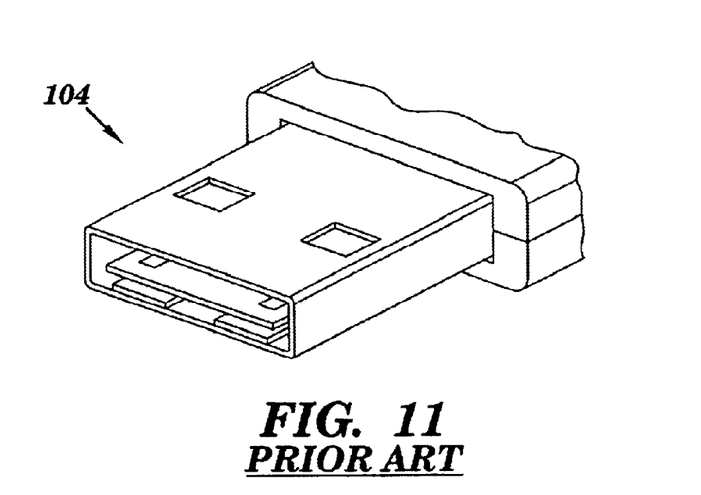
FIG. 11 is a perspective view of a prior art USB plug.

FIG. 10 shows a partial view of a prior art computer 100, such as a portable computing device as shown, including a pair of USB ports 102. Desktop computers as well as PDA's are also designed with USB ports as shown, and may include only one USB port or several USB ports. FIG. 11 shows a prior art USB plug 104, which is an "A" type connector, designed for insertion into USB port 102 of a computer 100. The USB plug 104 is typically located at the end of a USB cable extending from a peripheral device such as a printer, scanner, mouse, joystick, digital camera, web cam, modem, speaker, etc.

While the term USB port 102 and USB plug 104 are used, it should be understood that the ports may also be USB 2.0 ports and the plug may also be USB 2.0 plugs. USB 2.0 was released in 2000 and supports a bus speed 40 times faster than USB 1.x. Furthermore, it is within the scope of this invention to incorporate any update of the USB specification, as well as any other plug/port configuration usable within the computer environment.

Figure 12:
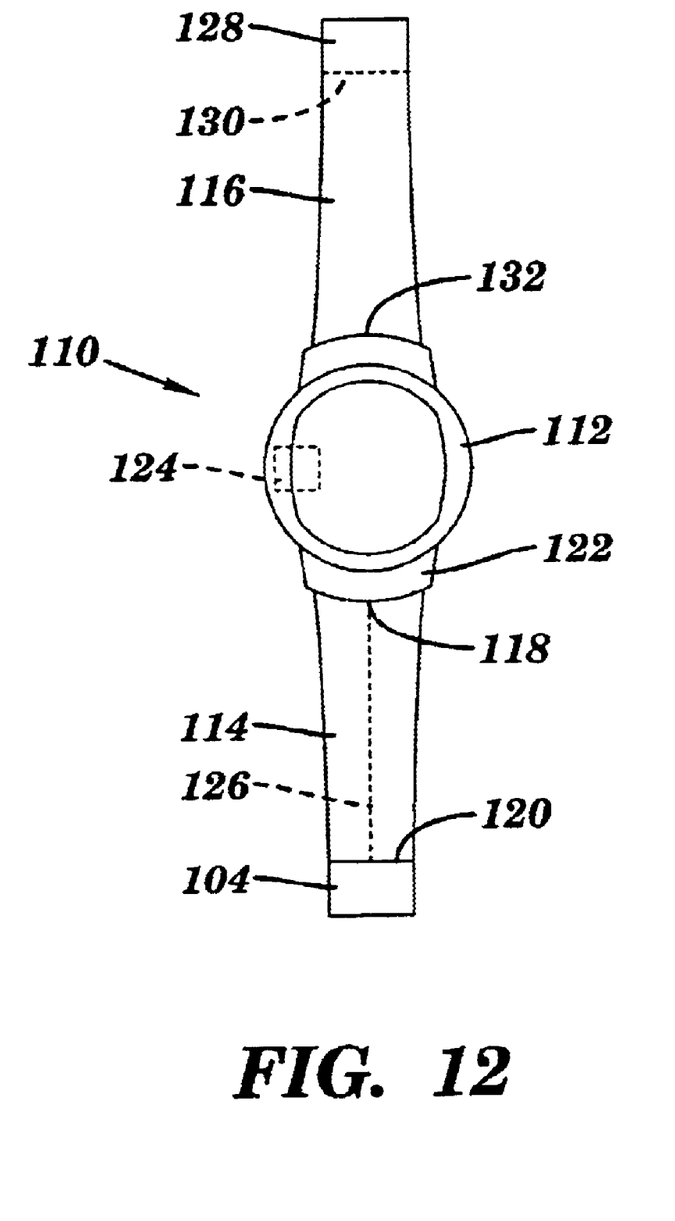
FIG. 12 is a front plan view of a wrist-worn electronic data storage device.

Turning now to FIG. 12, an alternate embodiment of a wrist-worn device 110 is shown. The wrist-worn device 110 includes an electronic data storage unit 112 and first and second straps 114, 116 such that the electronic data storage unit 112 may be secured to a wrist of a user. The electronic data storage unit 112 may include, but is not limited to, any one or a combination of a PDA, MP3 music player, voice recorder, infrared remote controller, GPS sensor, solid-state data storage device, or digital camera. Alternate data storage units which are suitable for use in a wrist worn device may also be included within unit 112. While the straps 114, 116 are described in length suitable for securement around a wrist, they may be long enough to secure around a waist of a user, or around a neck of a user, or in any other desired length. If alternate lengths are employed, wrist worn device 100 may be better termed "body worn device". Alternatively, the straps 114, 116 could be used to secure the unit 112 to any non-body part that is within reach of a user when employment of the device 110 is desired. For example, the straps 114, 116, may be used for securing the unit to a key chain, briefcase, pocket book, car accessory, backpack, or wherever the user may find such a device useful. First strap 114 may include a first end 118 adjacent to a first side 122 of the electronic data storage unit 112 and a second end 120. The second end 120 preferably includes a USB plug 104 for direct connection to a USB port 102 of a computing device. The USB plug 104 is preferably electronically connected to the electronic data storage unit 112 through a cable 126. With the USB plug 104 positioned directly on a strap 114 of the device 110, it becomes unnecessary to provide for a separate cable to connect the device 110 to a computer 100 or a cradle having such a cable and connected to the computer 100. Thus, data transport between the device 110 and the computer may be carried out directly and without additional elements which increase the chance for failure and increase attachment complexity.

In addition to data transport, the plug 104 and powered USB port 102 also preferably include terminals or pin-outs for providing power in a direction from the USB port 102 to the plug 104 for recharging rechargeable batteries 124 contained within the electronic data storage unit 112. Thus, the device 110 can be recharged by simply connecting the plug 104 into the port 102, thus eliminating the need for a recharger cable or cradle.

For protecting the plug 104 from debris or damage through wear, the strap 116 preferably includes a protective sleeve 128 sized for frictionally accepting the plug 104. The sleeve 128 may be positioned on an outer, second end 130 of the strap 116. The sleeve 128 may also be slidable along the strap 116 such that the combined length of straps 114 and 116 may be adjusted for conforming comfortably to a size slightly greater than a periphery of a wearer's wrist or waist, or any other size desired by the wearer.

Alternatively, the device 110 may include conventional latching or securing devices used in known watch configurations. For example holes or hooks may be employed with one or both of straps 114, 116 for cooperating with holes or hooks on the other of straps 114, 116. Alternatively, a slidable clamping device may be used. As an alternate embodiment to the protective sleeve 128, a protective cover, such as a cap, may be used to cover the plug 104 when not inserted into the port 102.

Also, while two straps 114, 116 are disclosed, it is also within the scope of this invention to utilize a single adjustable strap containing the plug 104, where the plug 104 may be inserted within the protective sleeve 128 positioned directly on a side 132 of the electronic data storage unit 112.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A wrist-worn phone comprising:

a main housing having a front surface and a rear surface, the rear surface including speaker holes, the front surface having a display;

a first strap attached to a first end of the main housing, the first strap having an outer end area;

a second strap attached to the second end of the main housing, the second stray having an outer end area, the outer end area of the first strap for connecting with the outer end area of the second strap;

wherein the second strap is made from a shape retaining material for forming a generally elongated C shape, wherein the rear surface of the main housing is on an interior of the C shape; and, an ear latch attached to the main housing for hanging the main housing on a human ear, wherein the ear latch includes a curved body having an attached end pivotally attached to the main housing and a free end, the free end adjacent to the main housing in a closed position and separated from the main housing in an open position.

2. The wrist-worn phone of claim 1 further comprising a microphone placed within the outer end area of the second strap.

3. The wrist-worn phone of claim 2 further comprising a conductor connecting the microphone to a radio transceiver within the main housing.

4. The wrist-worn phone of claim 1 wherein the first strap contains an antenna.

5. The wrist-worn phone of claim 1 further comprising a speaker within the main housing, the speaker positioned adjacent the speaker holes.

6. The wrist-worn phone of claim 1 further comprising buttons for dialing a telephone number, the buttons surrounding a periphery of the display.

7. The wrist-worn phone of claim 1 further comprising a connector for releasably connecting the free end of the ear latch to a connecting location on the main housing.

8. The wrist-worn phone of claim 1 further comprising a pivot for pivotally attaching the attached end of the ear latch to the main housing, the pivot having position memory.

9. The wrist-worn phone of claim 1 wherein the ear latch is ergonomically shaped to conform to a rear of a human ear.

10. The wrist-worn phone of claim 1 wherein the main housing includes a timekeeping circuit, a transceiver, and a display.

* * * * *

UNITED STATES PATENT AND TRADEMARK OFFICE
CERTIFICATE OF CORRECTION

PATENT NO. : 6,801,476 B2
DATED : October 5, 2004
INVENTOR(S) : Daniel A. Gilmour It is certified that error appears in the above-identified patent and that said Letters Patent is hereby corrected as shown below:

Column 2,
Line 13, after "circuits now" delete "allows," and insert therefor -- allows --

Column 8,
Line 69, after "second" delete "stray" and insert therefor -- strap --

Signed and Sealed this

Third Day of May, 2005

JON W. DUDAS
*Director of the United States Patent and Trademark Office*